Figure 1:
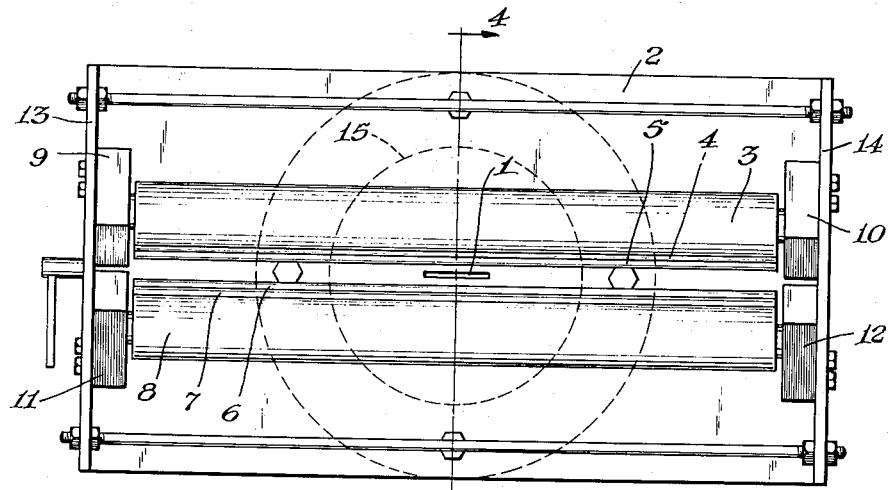

INVENTORS
John L. McCurdy
Chancey E. DeLong

BY Griswold & Burdick
ATTORNEYS

INVENTORS
John L. McCurdy
Chancey E. De Long

BY Griswold & Burdick
ATTORNEYS

April 3, 1956  J. L. McCURDY ET AL  2,740,157
METHOD AND APPARATUS FOR SHAPING PLASTIC FOAMS
Filed Dec. 7, 1951  3 Sheets-Sheet 3

INVENTORS
John L. McCurdy
Chancey E. De Long

BY Griswold & Burdick
ATTORNEYS

United States Patent Office 2,740,157
Patented Apr. 3, 1956

2,740,157

METHOD AND APPARATUS FOR SHAPING PLASTIC FOAMS

John Lloyd McCurdy, New London, Conn., and Chancey E. De Long, Freeland, Mich., assignors to The Dow Chemical Company, Midland, Mich., a corporation of Delaware Application December 7, 1951, Serial No. 260,546

12 Claims. (Cl. 18—12)

This invention concerns an improved method and apparatus for shaping elongated bodies of plastic foams, during formation of the latter, to obtain cellular sheets, slabs, or planks, of substantially uniform thickness. It pertains further to the production of plastic foam sheets which are of good uniformity both in width and thickness. It pertains still further to the shaping of side edges of such sheets, or slabs, during formation of the same.

The plastic foams herein dealt with are solid cellular bodies composed of a mass of individually closed cells having thin walls of a thermoplastic resin. It is known that elongated bodies, e. g. logs, of plastic foams may be made by dissolving a normally gaseous agent such as methyl chloride, propylene, or butylene, etc., in a thermoplastic resin at superatmospheric pressure to form a flowable gel, and extruding the latter through an orifice to a zone of lower pressure, usually atmospheric pressure. Upon extruding the gel, its normally gaseous ingredient vaporizes and thus expands and cools the mass with formation of an elongated plastic foam body. Such a procedure for making plastic foam bodies is disclosed in U. S. Patent No. 2,450,436. However, the cellular resin logs, or other elongated bodies obtained by such an extrusion possess rough, uneven surfaces and frequently have cracks extending to a considerable depth therein.

U. S. Patent No. 2,538,050 discloses operations of extruding the gel from a pressurized vessel through an open tubular forming and shaping chamber within which the extruded material expands to press against the inner surfaces of the chamber and is thus shaped into a cellular log, sheet, or board, etc. The patent teaches that inner surfaces of the shaping chamber are lubricated by injection of hot water or steam into the same at a multiplicity of points during extrusion of the plastic mass therethrough and points out that efficient lubrication is necessary for production of a well shaped elongated cellular article. However, it further points out that the lubricating effect of the hot water or steam is rapidly dissipated and that it is for this reason that water or steam must be injected into the shaping chamber at a multiplicity of closely spaced points.

This known method for shaping the extruded plastic material during expansion of the same possesses certain disadvantages. Due to the pressure of the expanding and hardening cellular mass against inner walls of the tubular shaping chamber, the resistance to flow through the chamber is considerable, even though the walls be well lubricated. Accordingly, it is sometimes necessary to pull the cellular sheet or beam from the shaping chamber as it is formed, particularly when it is of large, e. g. one square foot or more, cross section. However, in order to obtain a cellular log or sheet of uniform cross section throughout its length, it is necessary that the rate of withdrawal of the shaped cellular article, on a volume per hour basis, be a constant multiple of the rate of extrusion of the pressurized gel into the shaping chamber. If the rate of withdrawal is less than just stated, the cellular product bulges in spots, and if the rate of withdrawal is greater than just recommended, the shaping operation is incomplete and the cellular product possesses a non-uniform cross section. Also, the foaming mass within the shaping chamber tends to obstruct the inlets for the water or steam which is employed as a lubricant. Careful control is required to assure feed of the water, or steam to the chamber at a rate sufficient to provide the necessary lubrication, but not such as to cause channeling through the plastic material under treatment.

We have found that plastic foam sheets of substantially uniform thickness may be produced conveniently and economically by extruding the aforementioned resin gel from a pressurized chamber into an approximately horizontal slot-like passageway between substantially parallel shaping members, which slot, or passageway, is of a length, transverse to the direction of extrusion, such that the foaming resin mass may flow, or spread out, as a sheet within it without pressing against any vertical side walls, if such be present. It is important that the shaping members which define the passageway press against the foaming resin mass in a region where expansion of the mass is in an advanced stage, e. g. from 50 to 95 per cent complete. This region constitutes a line or path transverse to the general direction of flow of the extruded material and usually from 1 to 10 inches from the extrusion orifice, such distance being dependent upon the rate of extrusion. The pressure applied by the shaping members on the foaming mass in this region determines the thickness of the cellular sheet which is formed. The shaping members may also press against the extruded material at points, or in regions, closer to, or more remote from, the extrusion orifice than just stated, and in some instances with advantage, but this is not required. Each shaping member may be a plate, a beam, or a row of parallel rolls, etc. The shaping members should be such as to permit ready flow of the foaming mass through the slot therebetween. They may be lubricated at the surfaces thereof with hot water, steam, mineral oil, or other suitable lubricant. However, the resistance to flow which is involved in employing only a pair of shaping members is far less than when the foaming mass is shaped by expansion against inner walls of a tubular shaping device during passage through the latter. Accordingly, such pair of shaping members usually need not be lubricated to permit passage of the plastic mass therebetween under the force of the extrusion. In fact, it is frequently advantageous to retard the rate of delivery of the plastic foam sheet from the shaping plates for reasons hereinafter explained.

A plastic foam sheet produced as just described is of substantially uniform thickness throughout its length. It is usually of nearly uniform width. However, surges, or other changes in the rate of extrusion, sometimes occur and these result in corresponding changes in the width of the cellular sheet which is being formed. We have found that such changes in the width of the sheet may be avoided, or rendered so slight as to be negligible, by pressing against a hardened side surface, or preferably an upper surface, of the sheet with a spring loaded plate. The pressure thus applied should not be such as to prevent delivery of the sheet from the shaping device under the force of the extrusion. The frictional resistance of such spring loaded plate to movement of the sheet apparently becomes less with increase in the rate of travel of the sheet. Accordingly, an increase in rate of extrusion of the gel into the slot between the forming plates results in an increase in rate of delivery of the sheet from the forming plate, rather than in side flow, i. e. increased spreading, of the foaming resin mass in said slot such as would result in widening of the sheet.

The plastic foam sheets thus produced are nearly uniform, both in width and thickness, but possess rounded side-faces, or edges, which are usually not desired and are trimmed off to obtain square corners at the edges of the sheet and planar sides. We have further found that the sides may be shaped and rendered nearly planar during formation of the plastic foam sheet by positioning a substantially horizontal rod or bar at each side of the extrusion orifice, adjacent to the latter. Upon extruding the plastic gel, it flows over these bars before becoming expanded to a great extent. It then flows into the slot between the shaping members. Each lateral side of the ribbon of gel entering the slot is thus provided with an approximately half-round groove. The width of this groove is not highly critical, but usually corresponds to between ⅛ and ⅜ of the thickness of the plastic foam sheet to be produced. The subsequent expansion of the extruded material in the slot between the shaping plates, or rolls, eliminates these grooves with resultant production of a plastic foam sheet having nearly square corners at the side-edges thereof.

Figure 3:
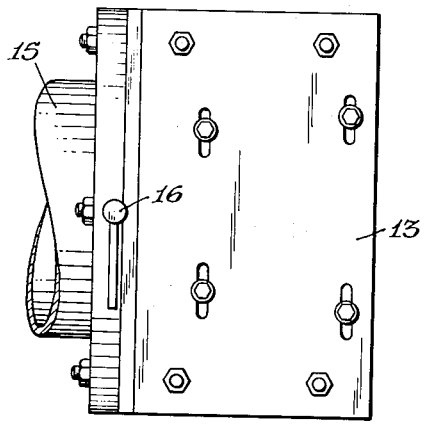
Figure 4:
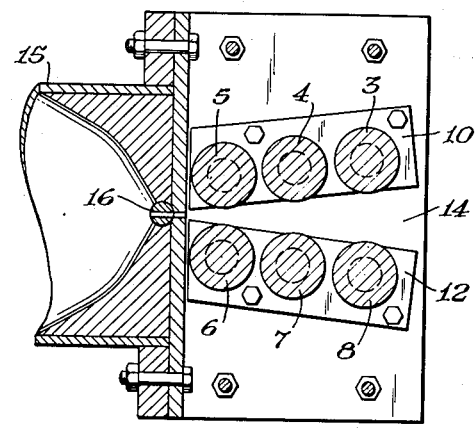
Figure 5:
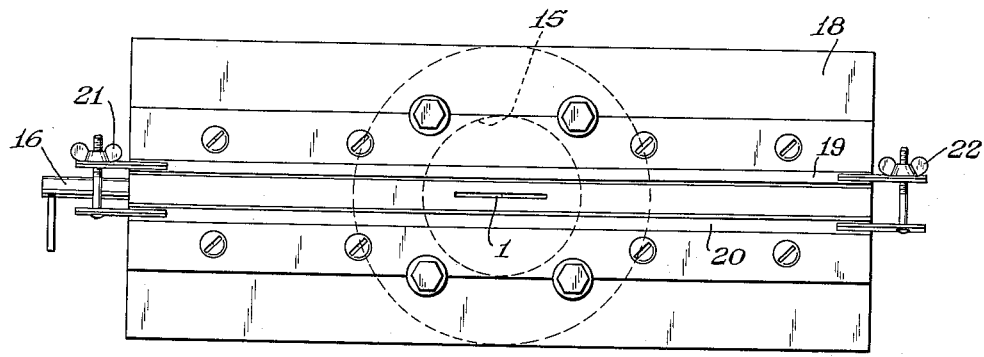
Figure 6:
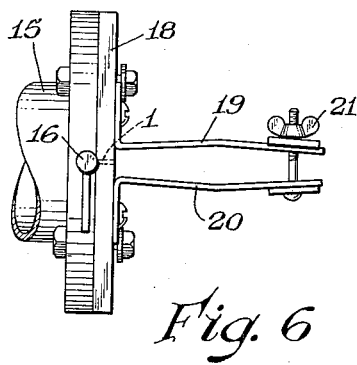
Figure 9:
Figure 11:
Figure 10:
Figure 7:
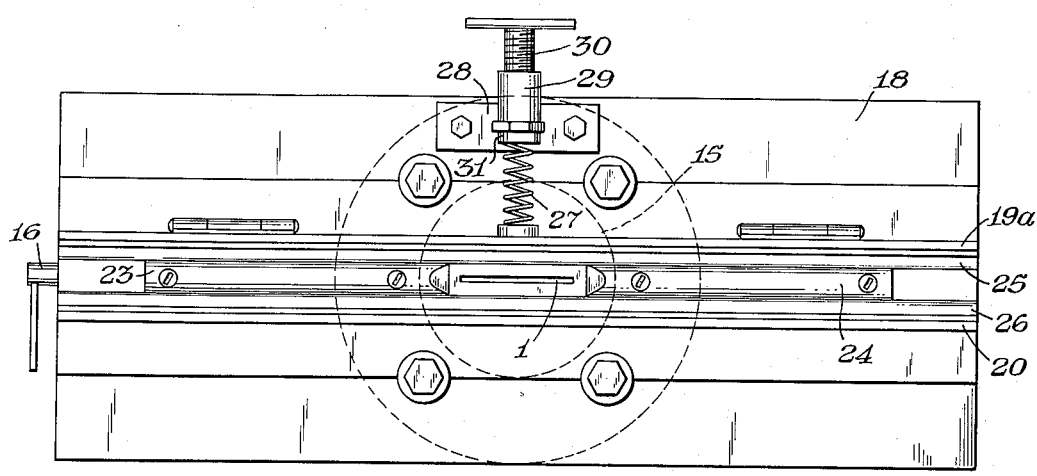
Figure 8:
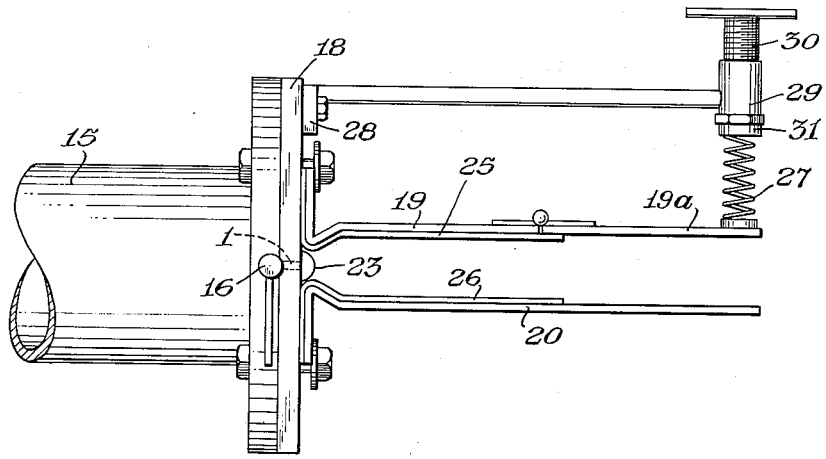

The accompanying drawing shows certain forms, or arrangements, of the shaping device of the invention. More specifically, Figs. 1–4 show a forming and shaping device wherein each of the pair of shaping members is a row of parallel rolls, the two rows of rolls diverging away from one another in the direction away from an extrusion orifice positioned to feed material to the rolls. Figs. 5 and 6 show a similar device, except that each shaping member consists of a plate, e. g. of a metal such as copper, brass, iron, steel, or a corrosion-resistant alloy steel, etc. Figs. 7 and 8 show a device similar to that of Figs. 6 and 7, except that the upper shaping plate has a hinged end-section which is spring-loaded, and horizontal bars, each having a rounded cross section, are positioned at the sides of the extrusion orifice. Figs. 9, 10, and 11 show plastic foam sheets which are of substantially uniform thickness throughout their length, but which vary from one another as to uniformity of width, or as to shape of the lateral sides thereof, due to variations in the method and apparatus for making the same which are hereinafter explained.

Figure 2:
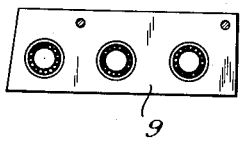

Fig. 1 is a frontal view of one modification of the forming and shaping device of the invention. In Fig. 1, the numeral 1 designates the orifice of an outlet from a pressure-resistant vessel, not shown. The orifice 1 is situated behind a shaper 2 which is shown as being bolted to the pressure-resistant vessel, but may be otherwise maintained in a position to receive material extruded from the vessel. The shaper 2 comprises two diverging rows of rolls 3—8, which rolls are supported at their ends by bearing supports 9—12 that are bolted to the end-plates 13 and 14 of the frame of the shaper. Fig. 2 is a side view of the bearing support 9 and shows the bearings therein. Fig. 3 is a side view of the shaper 2 and of a portion of the pressure-resistant vessel to which it is attached. In Fig. 3, the numeral 15 designates a portion of said vessel, 16 is a rotatable plug having a transverse passageway therethrough. The plug 16 is used for opening or closing the orifice 1 which serves as an outlet from the vessel, and 13 is an end-plate of the shaper 2. Plate 13 is provided with slots which accommodate bolts for holding the bearing supports 9 and 11 in place. The slots in plate 13 permit adjustment of the spacing between the two sets of rolls 3—5 and 6—8. Fig. 4 is a side view of the section 4—4 of Fig. 1. The parts shown in Fig. 4 are as described above.

Fig. 5 is a frontal view of another modification of the forming and shaping device of the invention. Fig. 6 is a side view of this same modification of the device. In Figs. 5 and 6, the numeral 15 designates a portion of a pressure-resistant vessel provided with a head plate 18 having the extrusion orifice 1 therein. Shaping plates 19 and 20 are bolted to plate 18. The plates 19 and 20 are provided with clamps 21 and 22 for adjusting the distance between the outer lips thereof.

Figs. 7 and 8 show a further modification of the forming and shaping device which is similar to that of Figs. 5 and 6, except as follows. In Figs. 7 and 8, horizontal bars 23 and 24 of rounded, e. g. half-round, cross section are attached to plate 18 on the two sides of the extrusion orifice 1; the shaping plates 19 and 20 are provided over portions of their surfaces, with layers 25 and 26 of Teflon, a solid polymer of tetrafluoroethylene, which exhibits only a slight frictional resistance to flow of the extruded thermoplastic resin compositions over its surface; and the plate 19 has a hinged end-section 19a which is loaded, e. g. pressed downward, by a spring 27. A bracket 28, which is bolted to plate 18, terminates at one end in an internally threaded cylinder 29 which accommodates a threaded bolt 30. The lower end of bolt 30 contacts a cup 31 which rests on the spring 27. The bolt 30 is used for adjusting the load applied by the same on the spring 27.

In the several embodiments of the forming and shaping device which are shown in Figs. 1–8, there is no sharp, or critical, limitation as to the cross sectional size of the extrusion orifice 1 relative to the distance between the rolls 5 and 6 of Figs. 1–4, or between the outer lips of the plates 19 and 20 of Figs. 5–8. It is merely necessary that orifice 1 be of a size such as to feed extruded material into the slot between such shaping members and that the slot be of a length sufficient to accommodate all of the material fed thereto. However, for purpose of making plastic foam sheet of one inch thickness and six inches width, the orifice 1 may conveniently have a one-sixteenth inch by two inches rectangular cross section and the shaping members, such as rolls 5 and 6 of Figs. 1–4, may be about one-fourth inch apart. The slot or passageway, between such shaping members should be of a breadth sufficient to accommodate a sheet of the desired width, e. g. each of the rolls 5 and 6 may have a length of eight inches or more. The dimensions just given are merely illustrative. An extrusion orifice of the above-stated size may be used to make plastic foam sheets which are of greater thickness, width, or both, than just stated, provided the rate of extrusion is increased, or the linear feet of such sheet produced per hour is decreased, to a corresponding extent.

In making a plastic foam sheet using the apparatus of Figs. 1–4, a flowable gel of a thermoplastic resin having a normally gaseous agent dissolved therein is formed under pressure in known manner within a vessel from which it may be extruded. The extrusion orifice 1 serves as an outlet from such a vessel. The outlet is opened, e. g. by rotating the plug 16, whereupon the gel extrudes from the vessel into the groove, or passageway, between the rows of rolls 3—5 and 6—8, respectively. Due to the decrease in pressure on the gel which occurs upon extruding the same, the normally gaseous ingredient of the gel vaporizes rapidly and thus expands the extruded material to form a cellular mass. Heat consumed in the vaporization cools and hardens the resulting cellular body. However, before and during a considerable part of the expansion, the extruded material remains flowable. The rolls 3—8, particularly rolls 5 and 6, serve to limit the thickness of the layer of extruded expanding material which may pass therebetween. As a result, the extruded material flows along the rolls 5 and 6, toward the ends of the same, to points at which it may pass between the rolls. The force of the extrusion causes flow of the material between the rolls, i. e. the resultant plastic foam sheet need not be pulled to effect delivery of the same from the rolls. Expansion of the extruded material occurs, for the most part, before and during passage of the same between the rolls. However, a slight amount of further expansion usually occurs as the plastic foam sheet is being delivered from the rolls. The plastic foam sheets thus produced are of substantially uniform thickness throughout all except the edge portions thereof, e. g. such sheet of one inch average thickness usually has thickness variations of not more than one-sixteenth inch throughout its length. Such sheets usually are also of substantially uniform width. However, surges sometimes occur in the rate of extrusion to form the sheet, and these cause variations in the width of the same. Fig. 9 shows a sheet produced during a period in which such change in the rate of extrusion occurred, i. e. the wider portion of the sheet is due to a surge in the rate of extrusion.

Except for employment of the plates 19 and 20 of Figs. 5—6, instead of the rolls 3—5 and 6—8 of Figs. 1–4, to adjust and control the thickness of a plastic foam sheet being produced, the procedure in making such sheet using the apparatus of Figs. 5–6 is substantially the same as that described above with regard to Figs. 1–4. The adjustable clamps 21 and 22 of Figs. 5 and 6 permit adjustment of the distance between the outer lips of the shaping members 19 and 20 so as to obtain a plastic foam sheet having a desired thickness. The plastic foam sheet produced with the apparatus of Figs. 5–6 is similar to that obtained with the apparatus of Figs. 1–4, i. e. Fig. 9 shows such a sheet produced during a period in which there was a surge in the rate of gel extrusion to form the sheet. The surge causes a widening of a section of the sheet, but does not affect its thickness.

The procedure in making a plastic foam sheet using the apparatus of Figs. 7 and 8 is also similar to that hereinbefore described with regard to the apparatus of Figs. 1–4. However, the apparatus of Figs. 7–8 includes certain mechanical elements which affect the ease, or smoothness, of operation. The layers 25 and 26 of a material, such as Teflon (polymerized tetrafluoroethylene), which affords only slight frictional resistance to the passage of a foaming thermoplastic resin mass over its surface, facilitate spreading of the extruded material as a layer of uniform thickness. However, the layers 25 and 26 may be omitted and, when used, preferably do not cover the entire complementary surfaces of the shaping members 19 and 20, since some frictional resistance to movement of the extruded plastic material therebetween is desired.

In Figs. 7 and 8, the hinged end-section 19a of the shaping member 19 is pressed, by the action of spring 27, against the plastic foam sheet as it is formed. End-section 19a thus provides a frictional resistance to forward movement of the sheet which causes sidewise spreading of the extruded gel between the shaping members 19 and 20 with resultant formation of a plastic foam sheet of a desired width. The spring loaded member 19a apparently performs a further function of providing a resistance to forward movement of the plastic foam sheet which varies inversely with change in the rate of gel extrusion to form the sheet. It thus reduces, or eliminates, widening of the sheet, which is being produced, upon occurrence of a surge in the extrusion rate. By employment of a spring 27 which is readily responsive to changes in the rate of gel extrusion, the effect of surges in the extrusion rate on the width, or thickness, of the plastic foam sheet being produced can practically be eliminated.

In producing a plastic foam sheet using the apparatus of Figs. 7 and 8, the freshly extruded gel, which is not yet swollen, or is only slightly swollen, by vaporization of its normally gaseous ingredient, flows over a portion of the length of the horizontal bars 23 and 24 and the stream of gel is thereby grooved at its sides. Immediately thereafter, i. e. during passage between the shaping members 19 and 20, the extruded material expands and fills out, or eliminates, the grooves. As a result of the combined action of the grooves initially provided in the freshly extruded stream of gel; of the shaping members 19 and 20 in controlling the thickness of the layer of extruded material passing between the same; and of the spring loaded member 19a in controlling the width of such layer, there is produced a plastic foam sheet which is substantially uniform, both in width and thickness, throughout its length and which has nearly planar sides, i. e. the sheet possesses a nearly square or rectangular cross section. Fig. 10 shows such a sheet.

It may be mentioned that the bars 23 and 24 are shown as possessing a half-round cross section, but that this is not essential, e. g. in place of such bars, rods of a circular cross section may be used. It is merely necessary that the members 23 and 24 have rounded outer surfaces over which the extruded gel may flow and that they be free of sharp edges, e. g. be bevelled, at the ends thereof adjacent to the extrusion orifice 1. The cross sectional dimensions of the members 23 and 24 are not highly critical. However, they are advantageously of a half-round cross section having a radius (for the circular cross sectional portion thereof) corresponding to between ⅛ and ⅜, preferably about ¼, of the thickness of the plastic foam sheet which is to be produced.

The method and the several modifications of the forming and shaping device, hereinbefore described may be changed in any of a number of ways without departing from the invention. For instance, in Figs. 7 and 8, the grooving members 23 and 24 may be eliminated and the device otherwise be employed as described above. When this is done, the plastic foam sheet which is produced is substantially uniform, both in width and thickness, lengthwise to the same, but is rounded at its sides. Fig. 11 shows a plastic foam sheet thus produced. Also, a spring loaded plate, similar to plate 19a of Figs. 7 and 8, may be applied against a plastic foam sheet at the delivery end of the foaming and shaping devices shown in Figs. 1–4 and in Figs. 5–6. Furthermore, in Figs. 1–4, the two rows of rolls 3–5 and 6–8, respectively, may be replaced with only a pair of rolls, e. g. with the rolls 5 and 6, or either of such rows may comprise from two up to any desired number of rolls. Other ways in which the method and apparatus of the invention may be modified will be evident to those skilled in the art.

The following examples describe certain ways in which the principle of the invention has been applied, but are not to be construed as limiting its scope.

*Example 1*

This example illustrates production of a plastic foam sheet, using a forming and shaping device similar to that illustrated in Figs. 1–4 of the drawing. A pressure-resistant chamber having the outlet section 15, shown in Figs. 3 and 4, contained a gel of polystyrene and about 9.75 per cent by weight of methyl chloride at a temperature of approximately 100° C. and a pressure of about 450 pounds per square inch, gauge. An extrusion orifice in the form of a horizontal slot having a rectangular cross section 2⅛ inches long and ⅟₁₆ inch wide served as an outlet from the vessel. The rolls, corresponding to rolls 5 and 6 of Figs. 1 and 4 were ⅜ inch apart, and the rolls 3 and 8 were ⅞ inch apart. The outlet from the vessel was opened, whereupon the gel extruded from the vessel at a rate corresponding to delivery of 30 pounds of its polystyrene ingredient per hour. The extruded material spread lengthwise against the rolls 5 and 6 and passed, as an expanding sheet, between the two rows of rolls 3–5 and 6–8, respectively. During passage between the two rows of rolls, the expanidng sheet pressed against surfaces of the rolls 4 and 7, causing said rolls to rotate, but it did not contact the rolls 3 and 8, i. e. rolls 3 and 8 did not, in this instance, perform any function. The sheet continued to expand slightly for a short, e. g. about 2 inch, portion of its travel from the rolls 4 and 7. The fully expanded plastic foam sheet which was thus formed and delivered from the rolls was ⅝ inch thick and 6 inches wide. Its lateral sides were rounded.

*Example 2*

A flowable gel, of polystyrene having methyl chloride dissolved therein, was extruded from a chamber which contained a body of the gel at a temperature of 103° C. and a pressure of about 600 pounds per square inch, gauge. The extruded material was directed into a slot-like passageway between a pair of shaping plates having inner, i. e. complementary, surfaces which were horizontal in a direction transverse to the direction of the extrusion. The forming and shaping device employed in the extrusion was similar to that illustrated in Figs. 5 and 6 of the accompanying drawing. An amount of gel containing 27 pounds of polystyrene was extruded per hour. The closest distance between the shaping plates was about 1/4 inch, and the distance between the outer lips of the plates was 5/8 inch. During passage between the extrusion plates, the extruded material swelled to press against inner surfaces of the plates and spread in a laterally-unrestricted manner with resultant formation and delivery from the plates of a cellular polystyrene sheet. The sheet continued to expand slightly during a short distance, e. g. from 5 inches to about 2 feet, of its travel away from the shaping plates. The fully expanded sheet had a substantially uniform thickness of 7/8 inch throughout its length and had a width of 4 inches. Its lateral sides were rounded. After operating as just described for some time, the rate of extrusion was increased without changing the distance between the lips of the shaping plates. This resulted in production of a cellular polystyrene sheet which was 7 1/2 inches wide and of 7/8 inch thickness, i. e. the increase in rate of extrusion caused a widening of the sheet being formed, but did not cause a change in the thickness of the sheet.

*Example 3*

A flowable gel of polystyrene and about 9.5 per cent by weight of methyl chloride was extruded from a vessel containing the same at a temperature of about 100° C. and a pressure of approximately 450 pounds per square inch, gauge. The extrusion orifice was a rectangular slot having a breadth of 4 1/2 inches and a height of 1/8 inch. The rate of extrusion corresponded to delivery of 315 pounds per hour of the polystyrene ingredient of the gel. The extruded material passed between the shaping plates 19 and 20 of a forming and shaping device similar to that shown in Figs. 7 and 8 of the drawing. The end section 19a of plate 19 was pressed downward by the spring 30 so as to retard, but not prevent, delivery of the resultant plastic foam sheet. The rods 23 and 24, at the sides of the extrusion orifice 1, served to groove the extruded gel before it had expanded greatly. During passage between the plates 19 and 20, the gel expanded, thus filling out the grooves and forming a plastic foam sheet similar to that shown in Fig. 10 of the drawing. The process, as just described, has been carried out to make plastic foam sheets of different cross sectional dimensions. The thickness of the sheets was varied by changes in the spacing between the plates 19 and 20, and the width of the sheets was varied by changes in the load applied by the spring 27 on the member 19a. The rods 23 and 24 were of diameters such as to produce sheets having substantially planar sides. The rods 23 and 24 which were used in making plastic foam sheet of 2 inches thick were of 1 inch diameter. Rods 23 and 24 of 1 1/4 inch diameter were used in making plastic foam sheets of from 3 to 4 inches thick.

The method and apparatus of the invention may be applied in producing plastic foam sheets of any thermoplastic resin. Examples of thermoplastic resins which may be employed in making such sheets are the solid homopolymers of styrene, ar-methylstyrene, ar-dimethylstyrene, alpha-methylstyrene, ar-chlorostyrene, methylmethacrylate, and vinylacetate, etc.; and copolymers of such compounds with one another, or with other polymerizable olefinic compounds such as butadiene-1,3, isoprene, vinyl chloride, or isobutylene; etc. However, solid polymers and copolymers of monoalkenyl aromatic compounds containing, as the alkenyl radical thereof, a vinyl or isopropenyl radical which is attached to a carbon atom of the aromatic nucleus, are usually employed in making the plastic foam sheets. The invention pertains especially to the production of cellular sheets of polystyrene.

Other modes of applying the principle of the invention may be employed instead of those explained, change being made as regards the method or apparatus herein disclosed, provided the steps or means stated by any of the following claims or the equivalent of such stated steps or means be employed.

We claim:

1. In a method wherein a plastic foam body is produced by extruding a stream of a flowable gel, of a thermoplastic resin having a normally gaseous agent dissolved therein, from a pressurized zone to a zone of lower pressure, whereupon said agent vaporizes with resultant swelling of the extruded material and formation of the plastic foam body, the steps of feeding the stream of expanding extruded material into a slot-like channel between a pair of shaping members, having parallel and substantially horizontal inner surfaces which define the width of the channel, at a feed rate such as to fill a section of the channel with a laterally unconfined stream of the extruded material so that the shaping members limit the thickness, but not the width, of the layer of extruded material passing therebetween and such that the extruded material expands to a self-sustaining plastic foam during passage through said channel, whereby there is formed and delivered from the pair of shaping members a plastic foam sheet of substantially uniform thickness lengthwise to the sheet.

2. A method, as described in claim 1, wherein a spring loaded plate, which may move vertically but is prevented from undergoing appreciable horizontal movement, is pressed against one of the side faces of the plastic foam sheet during delivery of the latter from the zone in which it is formed.

3. A method, as described in claim 1, wherein the stream of freshly extruded gel is grooved at its sides by being caused to spread and flow over rounded protuberances situated at the sides of the extrusion orifice and then is caused to flow through the channel between the pair of shaping members.

4. A method, as described in claim 1, wherein the resin ingredient of the gel is a polymer of at least one alkenyl aromatic compound containing, as the alkenyl radical thereof, a member of the group consisting of vinyl and isopropenyl radicals attached to a carbon atom of the aromatic nucleus.

5. A method, as described in claim 1, wherein the resin ingredient of the gel is polystyrene.

6. A device for forming and shaping a plastic foam sheet, which device comprises a pressure-resistant chamber having an extrusion orifice as an outlet therefrom and, situated immediately in front of the extrusion orifice and positioned to receive extruded material in a slot-like passageway therebetween, a pair of substantially parallel shaping members, one above the other and spaced apart to form a slot-like passageway therebetween, which shaping members each covers a sufficient area and extends sufficient distances laterally beyond the sides of the orifice so that the pair of shaping members limit the thickness of a layer of expandable material extruded therebetween without limiting its width during expansion and setting of the extruded material to a self-sustaining plastic foam.

7. A device, as described in claim 6, wherein a protuberance having rounded outer surfaces is situated at each lateral side of the extrusion orifice and adjacent to the latter.

8. A device, as described in claim 6, wherein each shaping member is a row of parallel rolls, the two rows of rolls diverging from one another in the direction away from the extrusion orifice.

9. A device, as described in claim 6, wherein the shaping members are a pair of plates.

10. A device, as described in claim 6, wherein the shaping members are a pair of plates and one of the plates has a hinged section thereof remote from the extrusion orifice, which hinged section is spring loaded so as to press against material passing between the plates.

11. A device, as described in claim 6, wherein the shaping members are a pair of plates, one of the plates has a hinged section thereof, remote from the extrusion orifice, which hinged section of the plates is spring loaded so as to press against material passing between the plates, and a solid protuberance having rounded outer surfaces is situated at each lateral side of the extrusion orifice and adjacent to the latter.

12. An extrusion device comprising an extrusion nozzle, two plates positioned adjacent said nozzle and constituting the sole means immediately adjacent to the nozzle for restraining plastic material extruded from said nozzle and undergoing expansion, said plates being parallel to one another and being positioned on opposite sides of the outlet from the nozzle, and said plates being of sufficient length and width to confine material extruded from the nozzle throughout lateral expansion of the material and during travel of the extruded expanding material until the material becomes set to a self-sustaining plastic foam.

References Cited in the file of this patent

UNITED STATES PATENTS

| | | |
|---|---|---|
| 1,818,101 | Slidell | Aug. 11, 1931 |
| 1,919,361 | Farrington | July 25, 1933 |
| 2,011,160 | Plepp | Aug. 13, 1935 |
| 2,075,735 | Loomis | Mar. 30, 1937 |
| 2,168,889 | Thomas | Aug. 8, 1939 |
| 2,354,260 | Haney et al. | July 25, 1944 |
| 2,512,506 | Saint Denis | June 20, 1950 |